(12) United States Patent
Bhatt et al.

(10) Patent No.: US 6,511,378 B1
(45) Date of Patent: Jan. 28, 2003

(54) METHOD OF IDENTIFYING GAME CONTROLLERS IN MULTI-PLAYER GAME

(75) Inventors: Dhiraj Bhatt, Portland, OR (US); Lynette A. Castlevetro, Portland, OR (US); Wells A. Brimhall, Portland, OR (US); Venkat U. Yellepeddy, Portland, OR (US); John L. Reid, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/566,848

(22) Filed: May 5, 2000

(51) Int. Cl.[7] .............................................. A63F 13/02
(52) U.S. Cl. ............................ 463/36; 463/30; 463/37; 463/38; 463/39
(58) Field of Search ....................... 463/1, 30, 36–39, 463/42, 47; 273/148 R, 148 B; 341/175; 345/329

(56) References Cited

U.S. PATENT DOCUMENTS

| 5,759,100 A | * | 6/1998 | Nakanishi ..................... 463/37 |
| 5,806,849 A | * | 9/1998 | Rutkowski ................... 273/438 |
| 5,807,175 A | * | 9/1998 | Davis et al. .................. 463/36 |
| 5,935,224 A | * | 8/1999 | Svancarek et al. ............ 710/63 |

* cited by examiner

*Primary Examiner*—Valencia Martin-Wallace
*Assistant Examiner*—Scott E. Jones
(74) *Attorney, Agent, or Firm*—Blakely, Sokoloff, Taylor & Zafman LLP

(57) ABSTRACT

In one embodiment, an operating system may assign a product ID to the game controller that matches the product ID provided with or for the game controller.

20 Claims, 5 Drawing Sheets

METHOD OF IDENTIFYING GAME CONTROLLERS IN MULTI-PLAYER GAME

BACKGROUND

The present disclosure is related to games that execute on a system or platform, such as a computer system.

As is well-known, one common use of a computing system or platform, such as a general-purpose computer, is to execute computer games. One type of computer game involves a player, the computer user, playing against the computer, meaning, in this context, that the computer executes software which provides the game environment and also allows the computer to respond to the player's "moves." In another type of computer game, players challenge or play each other in a game environment provided by software that the computer executes, rather than challenging the computer. In this context, these games are referred to as "multi-player" computer games.

Typically, when a multi-player game is provided for a computer, a separate game controller or similar device is coupled to the computer for each player participating in the game. In this context, the term 'connected' refers to direct physical contact between components or elements, whereas the term 'coupled,' in this context, although including direct physical contact, refers to components or elements that are electrically linked, but not necessarily in direct physical contact.

One problem that may occur for a multi-player game is identifying which player is associated with a particular game controller. Currently, trial and error is used to accomplish this. A player may experiment with a particular game controller and observed the effect on the game to deduce the player associated with the particular game controller out of the possible players in the multi-player game.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without the specific details. In other instances, well-known methods, procedures, components and circuits have not been described in detail so as not to obscure the present invention.

As previously described, an issue in multi-player games is identifying the game controller associated with a particular player from among the potential players of the game. Assume, for purposes of illustration, but not intending to limit the scope of the invention, that at least two game controllers, and potentially more game controllers, are coupled to a computing platform, such as a personal computer (PC) or other computing platform or system, such as one executing the Windows® 98 operating system, although, of course, the invention is not limited in scope to being employed by or in conjunction with a Windows-based Operating System or any other Microsoft Corp. software product. If a user in a multi-player game launches the game and there is more than one potential player, each player in the game being associated, here, with a different game controller, no convenient mechanism for associating a player or player number in the multi-player game with a particular game controller is available.

Figure 1:
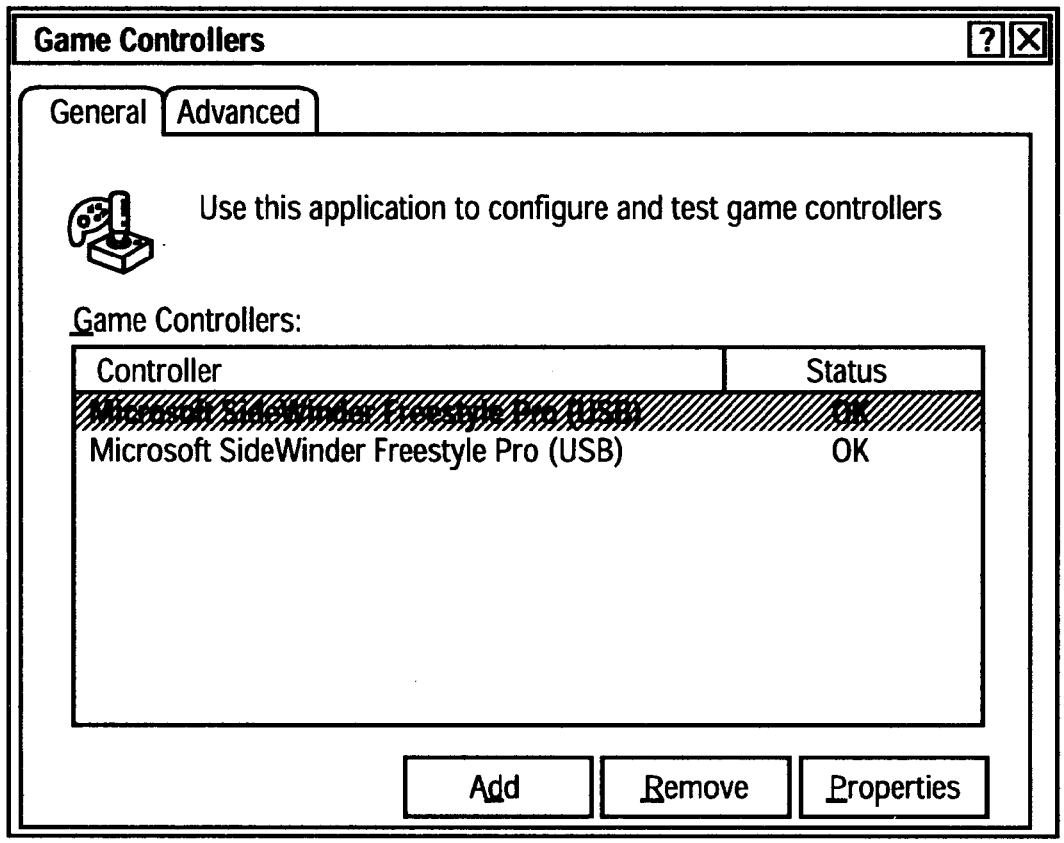
FIG. 1 is a screen shot of a Game Controller Control Panel from the Microsoft Windows® 98 operating system, where a prior art method of identifying game controllers in a multi-player game is used to identify the game controllers.

Currently, trial and error is used to accomplish this. An individual may experiment with a particular game controller and see the effect on the game to deduce the player associated with the particular game controller out of the possible players in the multi-player game. More specifically, a user employing, for example, a PC with the game controllers being coupled to the PC may view a list of game controllers under the "General Tab" of the Game Controllers Control Panel employed in the Windows 98 operating system. This is illustrated in FIG. 1 by a screen shot; however, as shown, this list does not assist a user in distinguishing between game controllers since each game controller, in this example, appears or is represented in substantially the same manner when viewed via the Game Controllers Control Panel.

Figure 2:
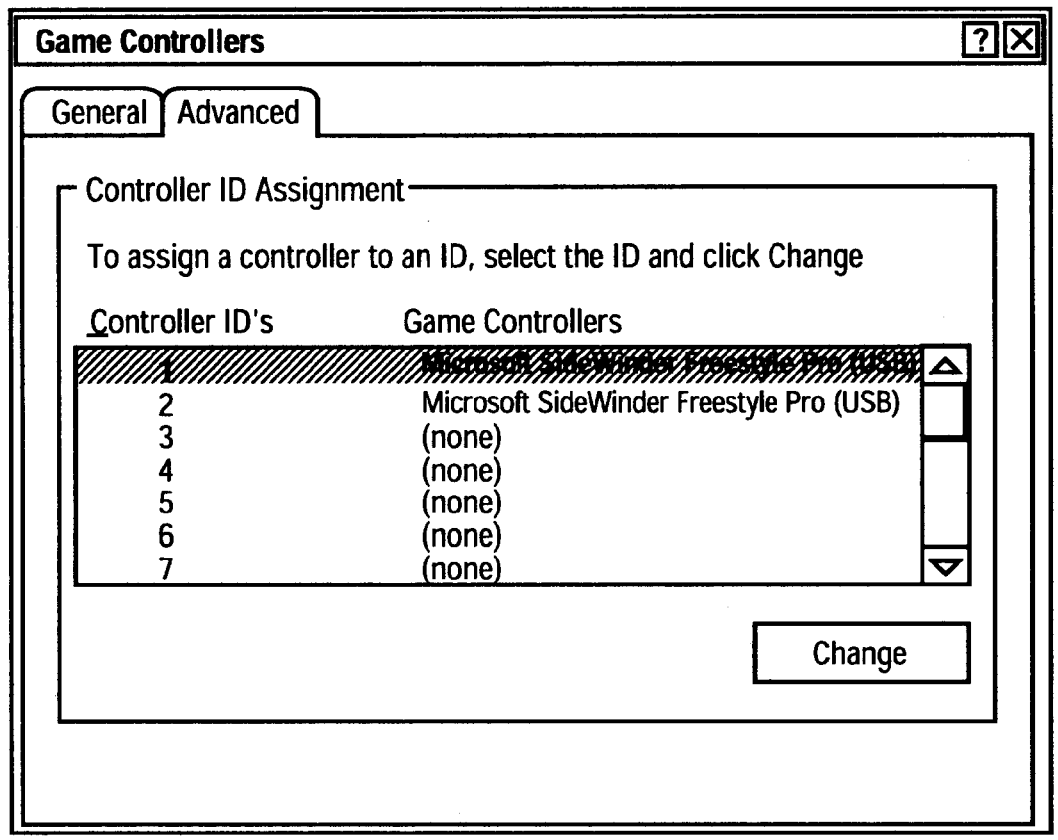
FIG. 2 is a screen shot of the Control Panel in FIG. 1 in which game controller IDs or device numbers are displayed.

Therefore, the user or users typically employ the following methodology to identify or associate a specific game controller with specific players in the game. The game controller that a particular user has in his or her possession is associated with a device in the list viewed as described above by testing or using that game controller's particular controls or buttons. This may be done, in this example, by "clicking" on "properties" in FIG. 1, and bringing up a particular game controller's test page. Once an association is established between a device in the list and the particular device or game controller held or possessed by a particular user, the game controller identification (ID) number is displayed on another tab via the Game Controllers Control Panel for the Windows 98 operating system, as shown in FIG. 2. This number is then assigned by the operating system and, therefore, employed by the game or games to associate a particular game controller or device with a particular player in the game.

In this particular example, there are two game controllers, although the invention is not restricted in scope in this respect. Despite the use of only two game controllers in this example, and, in general, the above process is repeated to associate a number with the second game controller for the list in the Game Controllers Control Panel.

Another similar approach is to begin using the game controllers and deduce from the responses during the game which game character or player, for example, or device number, is has been associated with the respective game controllers. It is, likewise, noted, that where the game controllers are of the same type, that is from the same vendor, and the controller are game port based, which does not apply, for example to USB compliant game controllers or wireless game controllers, it may be possible to couple them in a daisy-chain fashion. In this approach, a first game controller is plugged or coupled into the game port of the PC, where a PC is employed, for example, a second game controller is plugged or coupled into the game port of the first controller, etc. In this approach, the game controller connected to the PC is player number one, etc. Of course, as just indicated, this approach has disadvantages in that it does not apply to wireless devices or to devices that comply with USB. Furthermore, it is restricted to game port based devices from the same vendor/manufacturer.

Figure 4:
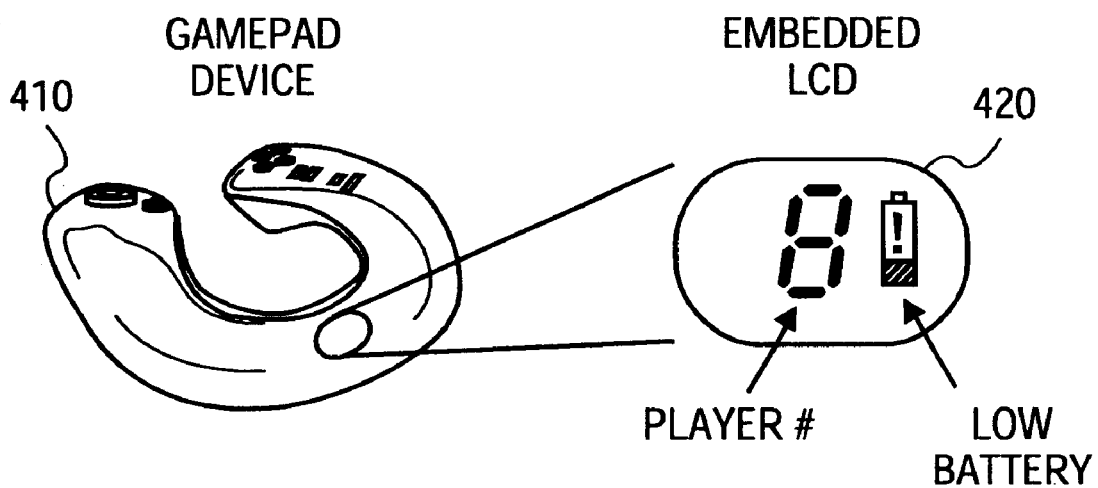
FIG. 4 is a perspective diagram of an embodiment of a game controller, including a game controller display that may provide the identity of the game controller in a multi-player game. An embodiment of a method of identifying game controllers in a multi-player game in accordance with the invention may be employed to identify the game controller In the multi-player game.

FIG. 4 is a diagram illustrating an embodiment of a game controller or game pad device in accordance with the invention. It is noted that the invention is not restricted in scope to this embodiment. In fact, the invention is not limited in scope to a game pad or game device having any particular configuration; however, a similar embodiment is also illustrated in co-pending U.S. Design patent application Ser. No. 29/119,952, titled "Game Pad," by P.C. Van Note et al., filed on Mar. 10, 2000 and assigned to the assignee of the present invention. It is noted that for the embodiment shown in FIG. 4, the player number may be displayed by an embedded liquid crystal display (LCD), although, again, the invention is not restricted in scope in this respect.

One particular embodiment of a method of identifying game controllers in a multi-player game may include the following. A unique identification (ID) is assigned to at least two game controllers in a multi-player game. Here, it is assumed that the multi-player game executes on a host computing system or platform. Of course, the at least two game controllers are coupled to the host computing system. This may be by any one of a variety of methods, such as by a direct electrical wire connection, or, alternatively coupling by a wireless medium, for example. A driver is executed on the host computing system that assigns a unique product identification (ID) to each of the at least two game controllers, for this embodiment, and an operating system is executed on the host computing system that confirms a match between the product ID assigned by the driver and a product ID respectively provided by each of the at least two game controllers.

In this particular embodiment, the product identification (ID) comprises an identification number, although, in alternative embodiments, a number may not necessarily be employed. Likewise, in this embodiment, the product ID is employed as the unique game controller ID, although, in other embodiments, a game controller ID other than the product ID may be assigned. Similarly, in alternative embodiments, the game controller ID may not necessarily be employed as the player ID for the multi-player game.

Figure 3:
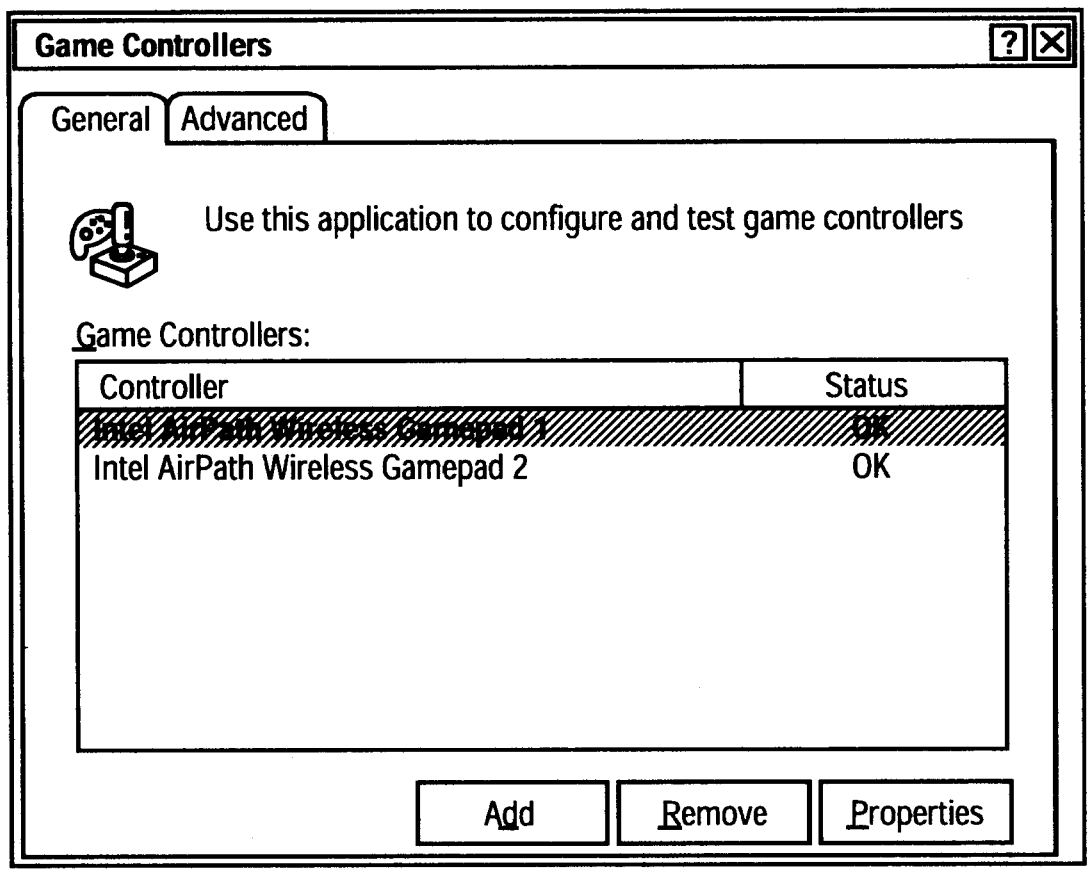
FIG. 3 is a screen shot of an operating system game controller control panel in which an embodiment in accordance with the invention has been employed to identify game controllers in the multi-player game.

For this embodiment, however, the product ID has an associated unique character string, and the character string includes a unique number that, in this embodiment, is employed as the player ID for the multi-player game. In this particular embodiment, if a user views a list of gaming devices in the operating system's game controllers control panel or in the game's own configuration options, each gaming device, such as 410, will appear with a unique number that includes the device number, as illustrated in FIG. 3. In this example, although two or more identical game pads or game controllers may be physically connected or wirelessly coupled to the PC, each device appears with a unique number that includes the device number. Furthermore, this device number may also be displayed on game pad LCD illustrated in FIG. 4 in this particular embodiment, although, again, the invention is not limited in scope in this respect. For this embodiment, rather than being directly connected to the PC or host computing system, a base station is physically and electrically connected to the host computing system and the game controllers are coupled to the base station via a wireless medium. Likewise, the base station is connected to the computing system or platform via a USB specification compliant port in this particular embodiment. Of course, these details of this particular embodiment are necessary for the invention. Therefore, many other alternative embodiments are possible.

Figure 5:
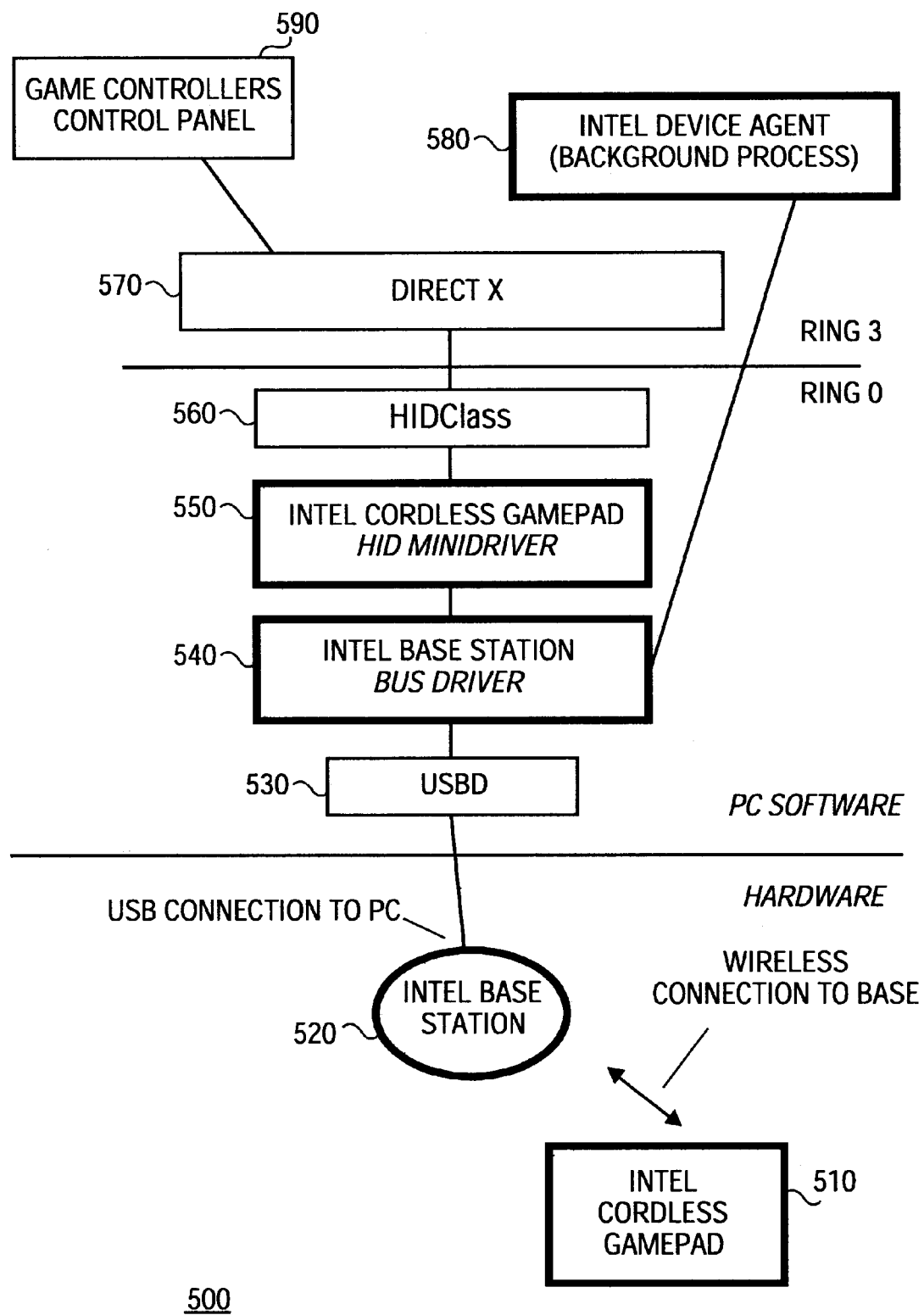
FIG. 5 is a block diagram illustrating an embodiment of an architecture of a hardware-software interface for an embodiment of a system that may employ an embodiment of a method for identifying game controllers in a multi-player game in accordance with the invention.

FIG. 5 is a block diagram illustrating an embodiment 500 of a method of identifying game controllers in a multi-player game. This block diagram is an abstraction of the interaction of the hardware and software of this particular embodiment purely for the purpose of illustration and is not intended to necessarily convey physical and/or electrical relationships. In embodiment 500, block 510 illustrates a cordless or wireless game pad. As previously described, pad 510 is coupled to base station 520 through a wireless medium. Therefore, the controller or pad and base station are not in direct physical contact in this particular embodiment, although they may be in other embodiments, of course. Blocks 590 to 530 here illustrate software executing on a host computing system at various levels of the operation system. For example, the "ring 0" level, or 'kernel mode' of the operating system, for example, commonly refers to, for Intel microprocessor architecture-based computing systems, a microprocessor's privilege level to which the particular software is mapped. This is illustrated schematically in FIG. 5 and is distinguished from "ring 3," which refers to another level of the operating system, here, the level to which most application software that executes on top of the operation system, is mapped.

A driver for reading and writing signals compliant with the USB specification is illustrated by block 530. Therefore, this software interprets the signals provided to the USB port for the computing system and provides signals in the appropriate USB format. Likewise, in order for the host computing system to provide signals direct to the base station and game pad, albeit in a USB compliant format, a bus driver 540 and Human Interface Device (HID) minidriver 550 execute on the host computing system in this embodiment. Likewise, HIDClass 560, in this embodiment, comprises part of the operating system and provides the main device driver for HID devices.

Bus driver 540 assigns a unique product ID for the game pad newly coupled, in this particular embodiment. Therefore, for each game pad coupled, a new unique product code is assigned. Likewise, in this embodiment, an information file is provided by the vendor on media such as, but not limited to, CD-ROM, 3.5 inch floppy diskette etc. In an alternative embodiment, the information file may also be installed on the computing platform by the action of the user running a setup program provided by the game pad vendor to install the software, including the information file. Therefore, the operating system will find a match between the product code assigned to the game pad and the product code in the information file. The unique device string associated with the product ID will then be employed to identify the player or game pad. In this embodiment, these strings comprise "game pad 1", "game pad 2", etc., although, of course, the invention is not restricted in scope in this respect.

FIG. 5 also illustrates additional programs executing at the "ring 3" level of the operating system, also known as "user mode" of the operating system. As indicated above, for Intel architecture microprocessor-based computing systems, application programs usually map to ring 3 of the processor's privilege level. In this embodiment, the computer game employs Direct X graphics software provided by Microsoft Corp., and illustrated by block 570, although, of course, the invention is not restricted in scope to using this particular software. In this embodiment, the game controllers control panel is provided by code, illustrated by block 590, that is executed on top of the Direct X software. Therefore, the control panel will now display the device string described above. Likewise, another program at the ring 3level, illustrated by block 580, executes in the background and monitors the game pads for status information and also programs the game pad so that the LCD for a particular game pad displays the associated player number.

As previously described, embodiments in accordance with the invention provide some advantages, such as allowing a user to nearly instantly know his or her player number within the game. Another potential advantage may occur where users interrupt or pause the game and come back to it later. In this circumstance, it may be desirable to quickly identify which device/player was being used. Likewise, some game environments may, as part of the game, shift or change player assignments. In such a situation, it would be more convenient to be able to tell the player assignments during the game either by looking at the game pad, or, alternatively, by looking at the control panel, as for the embodiments previously described.

One aspect of this particular embodiment is the feature that, once assigned, the same number is employed as the player ID at a given point in time. More particularly, the ID displayed, in such an embodiment, is the same as the player ID provided by the game for that controller, and is also the same as the player ID provided by an operating system that includes a game controllers control panel.

Of course, as previously indicated, a variety of alternative embodiments are possible. For example, in one embodiment, the operating system may assign a product ID to the game controller that matches the product ID provided with or for the game controller, even if one game controller is coupled to the host computing system. As previously indicated, this product ID may be displayed, such as where the game controller has a LCD. Likewise, a product ID may be provided with or for the game controller a variety of ways, such as in an information file provided on a storage medium or disk provided with the game controller, as previously described. Another embodiment may be implemented in hardware, whereas some embodiments may be implemented in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a host computer or computing system or platform, or an imaging system, may result in, for example, a method of identifying game controllers in a multi-player environment, or a method of assigning an ID to a game controller in accordance with the invention, such as, for example, one of the embodiments previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of assigning a unique product identification (ID) to at least two game controllers in a multi-player game that executes on a host computing system comprising:

coupling the at least two game controllers to the host computing system;

executing a driver on the host computing system that assigns the unique product identification (ID) to each of the at least two game controllers; and executing an operating system on the host computing system that confirms a match between the unique product identification (ID) assigned by the driver and a product identification (ID) provided by each of the at least two game controllers.

2. The method of claim 1, wherein the product identification (ID) comprises an identification number.

3. The method of claim 1, wherein the product identification (ID) is employed as a unique game controller identification (ID).

4. The method of claim 3, wherein the unique game controller identification (ID) is employed as a player identification (ID) for the multi-player game.

5. The method of claim 1, wherein each unique product identification (ID) has an associated a unique character string, the associated unique character string including a unique number, the unique number being employed as a player identification (ID) for the multi-player game.

6. The method of claim 5, wherein each game controller includes a display, and further comprising:

displaying the player identification (ID) for the particular game controller on each of the at least two game controllers.

7. The method of claim 6, wherein the displayed player identification (ID) for each respective game controller is the same as the player identification (ID) associated with each respective controller by the multi-player game.

8. The method of claim 7, wherein the operating system has a game controllers control panel, the game controllers control panel has the same player identification (ID) for each respective game controller as the displayed player identification (ID) for each respective game controller.

9. The method of claim 1, wherein coupling the at least two game controllers comprises coupling more than two game controllers to the host computing system.

10. The method of claim 1, wherein a base station is connected to the host computing system and the at least two game controllers are coupled to the base station via a wireless communications medium.

11. The method of claim 1, wherein a base station is connected to the host computing system via a USB specification compliant port.

12. A method comprising:

assigning a product identification (ID) to a game controller in a game that executes on a host computing system, wherein the game controller is coupled to the host computing system via a wireless medium; and assigning a product identification (ID) to the game controller via an operating system of the host computing system that matches the product identification (ID) for the game controller.

13. The method of claim 12, wherein the game controller includes an electronic display, and further comprising;

electronically displaying the matched product identification (ID).

14. The method of claim 12, wherein the electronic display comprises a liquid crystal display (LCD).

15. The method of claim 12, wherein the product identification (ID) for the game controller is provided in an information file associated with the game controller.

16. The method of claim 15, wherein the information file is provided on a storage medium associated with the game controller.

17. The method of claim 12, wherein another game controller is coupled to the host computing system via the wireless medium, and further comprising:

assigning a different product identification (ID) to the another game controller via the operating system of the host computing system that matches a product identification (ID) for the another game controller.

18. An article comprising: a storage medium, having stored thereon, instructions, that, when executed by a host computing platform, result in executing the following:

assigning a product identification (ID) to a game controller; and assigning a product identification (ID) to the game controller via an operating system of the host computing system that matches a product identification (ID) for the game controller.

19. The article of claim 18, wherein the game controller includes an electronic display, the storage medium having stored thereon, instructions, that further result in:

electronically displaying the matched product identification (ID).

20. The article of claim 18, wherein the product identification (ID) for the game controller is provided in a stored information file associated with the game controller.

* * * * *

UNITED STATES PATENT AND TRADEMARK OFFICE
CERTIFICATE OF CORRECTION

PATENT NO.    : 6,511,378 B1
DATED         : January 28, 2003
INVENTOR(S)   : Bhatt et al.

It is certified that error appears in the above-identified patent and that said Letters Patent is hereby corrected as shown below:

Column 4,
Line 4, after "LCD", insert -- 420 --.

Signed and Sealed this

Nineteenth Day of August, 2003

JAMES E. ROGAN
*Director of the United States Patent and Trademark Office*